(12) United States Patent
Li et al.

(10) Patent No.: US 10,169,634 B2
(45) Date of Patent: Jan. 1, 2019

(54) METHOD, DEVICE AND COMPUTER-READABLE STORAGE MEDIUM FOR FINGERPRINT RECOGNITION

(71) Applicant: Xiaomi Inc., Beijing (CN)

(72) Inventors: Guosheng Li, Beijing (CN); Anyu Liu, Beijing (CN); Linghua Gu, Beijing (CN)

(73) Assignee: XIAOMI INC., Beijing (CN)

( * ) Notice: Subject to any disclaimer, the term of this patent is extended or adjusted under 35 U.S.C. 154(b) by 20 days.

(21) Appl. No.: 15/356,683

(22) Filed: Nov. 21, 2016

(65) Prior Publication Data
US 2017/0154198 A1  Jun. 1, 2017

(30) Foreign Application Priority Data
Nov. 26, 2015  (CN) .......................... 2015 1 0835514

(51) Int. Cl.
  *G06K 9/00* (2006.01)
  *G06K 9/32* (2006.01)
  *G06F 3/041* (2006.01)

(52) U.S. Cl.
  CPC ......... *G06K 9/0002* (2013.01); *G06F 3/0416* (2013.01); *G06K 9/00013* (2013.01); *G06K 9/3241* (2013.01)

(58) Field of Classification Search
  CPC ... G06K 9/0002; G06F 3/0416; G06F 3/0412; G06F 3/0421; G02F 1/3338;
  (Continued)

(56) References Cited

U.S. PATENT DOCUMENTS 6,049,620 A * 4/2000 Dickinson .............. G01B 7/004
  382/108
6,628,810 B1 * 9/2003 Harkin ................. A61B 5/1171
  382/116

(Continued)

FOREIGN PATENT DOCUMENTS

CN  103886237 A  6/2014
CN  104318222 A  1/2015
(Continued)

OTHER PUBLICATIONS

Lirong Wang et al, "A novel contactless aliveness-testing (CAT) fingerprint sensor", SPIE—International Society for Optical Engineering. Proceedings, vol. 7429, Aug. 20, 2009, p. 742915, US.

(Continued)

*Primary Examiner* — Amir Alavi
(74) *Attorney, Agent, or Firm* — Jun He Law Offices P.C.; James J. Zhu

(57) ABSTRACT

A method, device and a computer-readable storage medium for fingerprint recognition are provided. The method for fingerprint recognition may be applied to an electronic device including a liquid crystal display, and the liquid crystal display has fingerprint recognition sensors and optical proximity sensors. The method includes: acquiring a fingerprint recognition instruction; determining an area made up of a part of the optical proximity sensors after acquisition of the fingerprint recognition instruction, the distance between each of the part of the optical proximity sensor and a touch operation being less than a predetermined distance threshold; selecting a part of the fingerprint recognition sensors according to the area; and controlling the selected part of the fingerprint recognition sensors to perform fingerprint recognition.

20 Claims, 7 Drawing Sheets

(58) Field of Classification Search
CPC ......... G02F 1/133528; G02F 1/133514; G02F 1/133512; G02F 1/1368; G02F 1/136286; G02F 2001/133302
See application file for complete search history.

(56) References Cited

U.S. PATENT DOCUMENTS

| | | | | |
|---|---|---|---|---|
| 7,274,808 | B2* | 9/2007 | Baharav | G06F 3/0421 382/124 |
| 9,697,409 | B2* | 7/2017 | Myers | G06K 9/0002 |
| 2009/0296997 | A1 | 12/2009 | Rocheford | |
| 2014/0359757 | A1 | 12/2014 | Sezan et al. | |
| 2015/0235098 | A1* | 8/2015 | Lee | G06K 9/00912 715/709 |
| 2016/0011767 | A1* | 1/2016 | Jung | G06F 3/0488 715/847 |
| 2016/0034741 | A1* | 2/2016 | Lan | G06K 9/00 382/124 |
| 2016/0110025 | A1* | 4/2016 | Hossu | G06F 3/0412 382/124 |
| 2016/0378328 | A1* | 12/2016 | Abrahams | G06F 3/04883 715/863 |
| 2017/0053149 | A1* | 2/2017 | Jiang | G06F 21/32 |
| 2017/0154198 | A1* | 6/2017 | Li | G06K 9/0002 |
| 2017/0154199 | A1* | 6/2017 | Li | G06K 9/0002 |
| 2017/0235994 | A1* | 8/2017 | Yang | G06K 9/0002 382/124 |

FOREIGN PATENT DOCUMENTS

| | | |
|---|---|---|
| CN | 104463082 A | 3/2015 |
| CN | 104536638 A | 4/2015 |
| CN | 104751106 A | 7/2015 |
| CN | 104951776 A | 9/2015 |
| CN | 105094234 A | 11/2015 |
| CN | 105488464 A | 4/2016 |
| EP | 1187056 A2 | 3/2002 |

OTHER PUBLICATIONS

Extended European Search Report of European Application No. 16199694.7.
International Search Report of PCT Application No. PCT/CN2016/100066.
The First Office Action in Chinese application No. 201510835514.3, dated Jun. 27, 2018.
Jingang Zhang: "A Method to Reduce Power Consumption of Embedded Fingerprint Identification System and its Application", published on Jan. 15, 2013, retrieved from the China Master's Theses Full-text Database.

* cited by examiner

METHOD, DEVICE AND COMPUTER-READABLE STORAGE MEDIUM FOR FINGERPRINT RECOGNITION

CROSS-REFERENCE TO RELATED APPLICATION

This application is based on and claims priority to Chinese Patent Application No. 201510835514.3, filed on Nov. 26, 2015, which is incorporated herein by reference in its entirety.

FIELD

The present disclosure relates to the field of liquid crystal display, and more particularly, to a method, device and computer-readable storage medium for fingerprint recognition.

BACKGROUND

Fingerprint recognition sensor equipped in an electronic device may recognize and verify a user's fingerprint. After successful verification, the user may be allowed to operate the electronic device, which may avoid the electronic device being operated by strangers and ensure the safety of the electronic device.

In the case that the fingerprint recognition sensors are evenly distributed on the liquid crystal display of the electronic device, a typical method for fingerprint recognition includes the following steps: the electronic device detecting whether an operation acting on the liquid crystal display is received, performing progressive scanning to the fingerprint recognition sensors in the liquid crystal display from the first row to the last row when the operation acting on the liquid crystal display is received, and acquiring the user's fingerprint.

SUMMARY

A method, device and computer-readable storage medium for fingerprint recognition are provided by the present disclosure.

According to a first aspect of embodiments of the present disclosure, a method for fingerprint recognition in an electronic device including a liquid crystal device is provided, and the liquid crystal device has fingerprint recognition sensors and optical proximity sensors. The method may include: acquiring a fingerprint recognition instruction; determining an area made up of a part of the optical proximity sensors after acquisition of the fingerprint recognition instruction, the distance between each of the part of the optical proximity sensors and a touch operation being less than a predetermined distance threshold; selecting a part of the fingerprint recognition sensors according to the area; and controlling the selected part of the fingerprint recognition sensors to perform fingerprint recognition.

According to a second aspect of embodiments of the present disclosure, a device for fingerprint recognition is provided. The device may include: a liquid crystal display having fingerprint recognition sensors and optical proximity sensors; a processor; and a memory for storing instructions executable by the processor; wherein the processor is configured to: acquire a fingerprint recognition instruction; determine an area made up of a part of the optical proximity sensors after acquisition of the fingerprint recognition instruction, the distance between each of the part of the optical proximity sensors and a touch operation being less than a predetermined distance threshold; select a part of the fingerprint recognition sensors according to the area; and control the selected part of the fingerprint recognition sensors to perform fingerprint recognition.

According to a third aspect of the present disclosure, there is provided a non-transitory computer-readable storage medium having stored therein instructions that, when executed by a processor, causes the processor to perform a method for fingerprint recognition. The method includes: acquire a fingerprint recognition instruction; determining an area made up of a part of the optical proximity sensors after acquisition of the fingerprint recognition instruction, the distance between each of the part of the optical proximity sensors and a touch operation being less than a predetermined distance threshold; select a part of the fingerprint recognition sensors according to the area; and control the selected part of the fingerprint recognition sensors to perform fingerprint recognition.

It is to be understood that the above general description and the following detailed description are merely for the purpose of illustration and explanation, and are not intended to limit the scope of the protection of the disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to example embodiments, examples of which are illustrated in the accompanying drawings. The following description refers to the accompanying drawings in which same numbers in different drawings represent same or similar elements unless otherwise described. The implementations set forth in the following description of example embodiments do not represent all implementations consistent with the present disclosure. Instead, they are merely examples of devices and methods consistent with aspects related to the present disclosure as recited in the appended claims.

Figure 1:
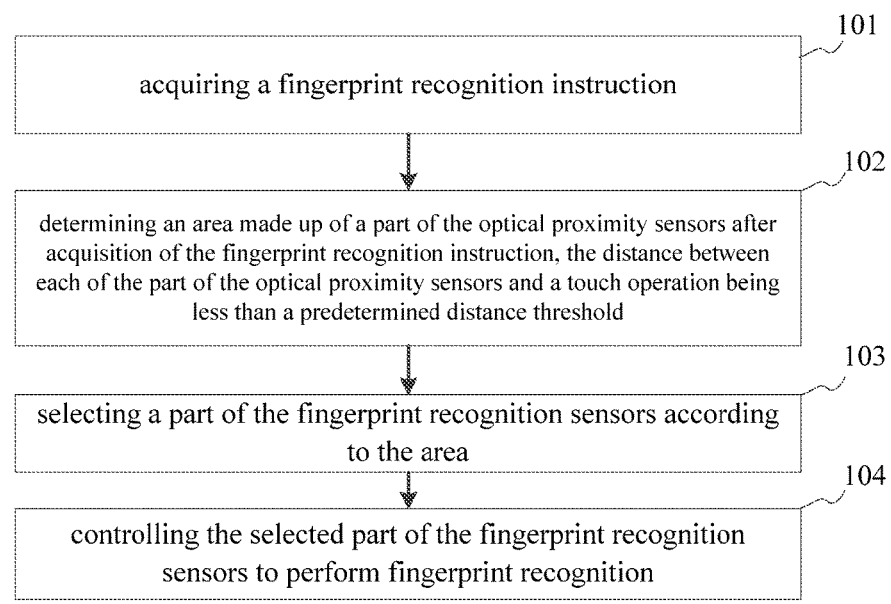
FIG. 1 is a flow diagram illustrating a method for fingerprint recognition according to an exemplary embodiment.

FIG. 1 is a flow diagram illustrating a method for fingerprint recognition according to an exemplary embodiment. The method for fingerprint recognition may be applied to an electronic device including a liquid crystal display and the liquid crystal display has fingerprint recognition sensors and optical proximity sensors. As shown in FIG. 1, the method may include following steps.

At step 101, a fingerprint recognition instruction is acquired.

At step 102, an area made up of a part of the optical proximity sensors is determined after acquisition of the fingerprint recognition instruction, and the distance between each of the part of the optical proximity sensors and a touch operation is less than a predetermined distance threshold.

At step 103, a part of the fingerprint recognition sensors are selected according to the area.

At step 104, the selected part of the fingerprint recognition sensors is controlled to perform fingerprint recognition.

In conclusion, the method for fingerprint recognition provided by the present disclosure may control a part of the fingerprint recognition sensors to perform fingerprint recognition by: acquiring a fingerprint recognition instruction; determining an area made up of a part of the optical proximity sensors after acquisition of the fingerprint recognition instruction, the distance between each of the part of the optical proximity sensors and a touch operation being less than a predetermined distance threshold; selecting the part of the fingerprint recognition sensors according to the area; and controlling the selected part of the fingerprint recognition sensors to perform fingerprint recognition. Thus, resource wasting caused by using all the fingerprint recognition sensors on the liquid crystal display for fingerprint recognition may be avoided, and resources are saved.

Figure 2A:
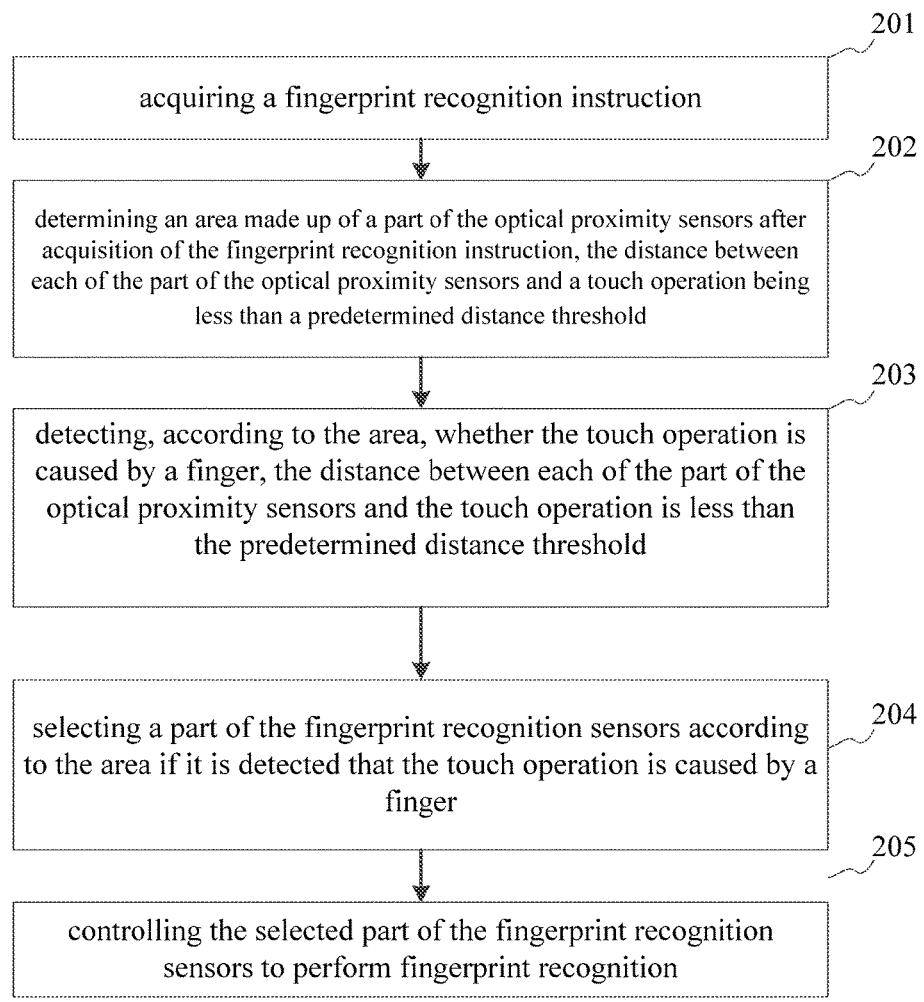
FIG. 2A is a flow diagram illustrating a method for fingerprint recognition according to another exemplary embodiment.

FIG. 2A is a flow diagram illustrating a method for fingerprint recognition according to another exemplary embodiment. The method for fingerprint recognition may be applied to an electronic device including a liquid crystal display, and the liquid crystal display has fingerprint recognition sensors and optical proximity sensors. As shown in FIG. 2, the method may include following steps.

At step 201, a fingerprint recognition instruction is acquired.

The fingerprint recognition instruction is used for instructing the electronic device to start the fingerprint recognition service for fingerprint recognition. The fingerprint recognition instruction may be generated during the use of an application by the user's controlling the application via an operation portion, or acquired by the electronic device in other ways. The way to obtain the fingerprint recognition instruction is not limited by the embodiment.

At step 202, an area made up of a part of the optical proximity sensors is determined after acquisition of the fingerprint recognition instruction, and the distance between each of the part of the optical proximity sensors and a touch operation is less than a predetermined distance threshold.

After the fingerprint recognition instruction is received, the user may trigger a touch operation on the liquid crystal display, such that the electronic device can perform fingerprint recognition. When the touch operation is getting closer to the liquid crystal display, an optical signal transmitted by respective transmission ends of the optical proximity sensors may be reflected by the touch operation to generate a reflected signal, and respective receiving ends of the optical proximity sensors will receive the reflected signal. The electronic device may determine the part of the optical proximity sensors having receiving ends that receive the reflected signals as the optical proximity sensors.

Alternatively, the electronic device may further calculate the distance between the touch operation and the liquid crystal display based on the time duration from the transmission of the optical signal to the reception of the reflected signal by each optical proximity sensor.

The distance between the finger and the liquid crystal display may be calculated according to the following function: $s=c*t/2$; wherein s is the distance between the finger and the liquid crystal display; c is the speed of light: $3\times10^8$ m/s; and t is the time duration from the transmission of the optical signal to the reception of the reflected signal by each optical proximity sensor.

When implemented, the electronic device may acquire, according to each optical proximity sensor, the determined distance between the touch operation and the liquid crystal display, and determine whether each determined distance is less than the predetermined distance. When the distance is less than the predetermined distance, it indicates that the optical proximity sensor can detect the presence of a nearby touch operation.

Figure 2B:
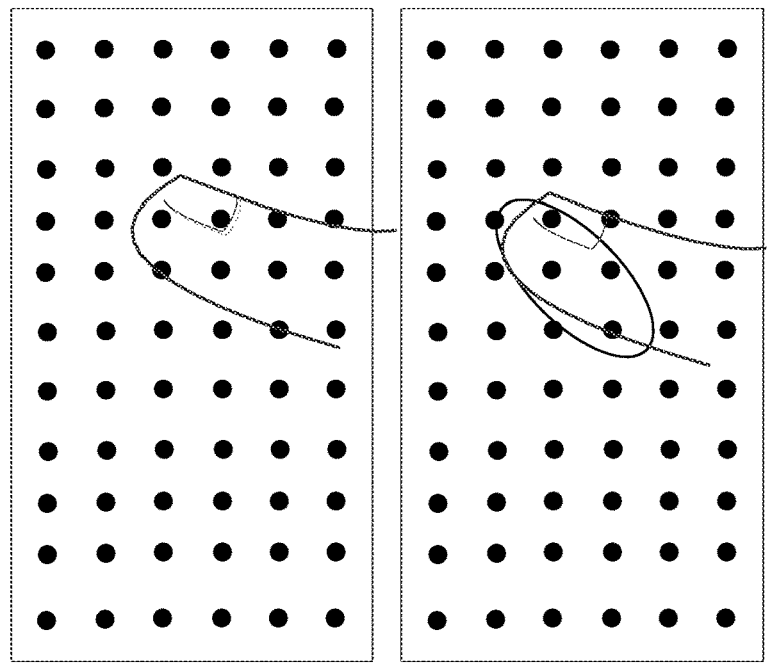
FIG. 2B is a schematic diagram illustrating a recognition area according to another exemplary embodiment.

In the embodiment, the electronic device may determine an area occupied by positions of the optical proximity sensors having received the reflected signal. Referring to FIG. 2B, which is a schematic diagram of the area, each of the dark spots within the liquid crystal display represents an optical proximity sensor, wherein the left side view of FIG. 2B shows that a user's finger is approaching the liquid crystal display, the right side view of FIG. 2B shows an elliptical area formed when the finger is getting close to the liquid crystal display.

At step 203, whether the touch operation is triggered by a finger is determined according to the area. When it is detected, according to the area, that the touch operation is triggered by a finger, step 204 is triggered.

The touch operation may be triggered by the user's finger or by other body parts, such as palm, so the electronic device needs to exclude the touch operation triggered by other body parts, so as to avoid the resource wasting caused by start of the fingerprint recognition service triggered by other body parts.

When implemented, the electronic device may calculate the size of the covered area, and detect whether the size is smaller than a predetermined size threshold. When the size is smaller than the predetermined size threshold, the electronic device may determine that the touch operation is triggered by a finger; when the size is larger than the predetermined size threshold, it may determine that the touch operation is not triggered by a finger. Alternatively, the electronic device may detect whether the shape of the cover area is elliptical. When the shape is elliptical, the electronic device may determine that the touch operation is triggered by a finger; when the shape is not elliptical, the electronic device may determine that the touch operation is not triggered by a finger. In addition, the electronic device may detect whether the touch operation is triggered by a finger in other ways, which is not limited in the embodiment.

At step 204, a part of the fingerprint recognition sensors are selected according to the area.

In the process of a finger getting close to the liquid crystal display, the receiving ends of the optical proximity sensors in an area receive the reflected signal and the electrical device is required to recognize the fingerprint of the finger, so the electrical device may select a part of the fingerprint recognition sensors for fingerprint recognition according to the area. Thus, resource wasting caused by the use of all the fingerprint recognition sensors on the liquid crystal display for fingerprint recognition may be avoided, and resources are saved.

The embodiment provides various methods for selecting a part of the fingerprint recognition sensors according to the area, which will be introduced below.

In some embodiments, each of the fingerprint recognition sensors within the area is determined.

The electronic device may control each of the fingerprint recognition sensors within the area to perform fingerprint recognition. The electronic device may acquire the coordinate of each of the fingerprint recognition sensors on the liquid crystal display, and then determine each of the fingerprint recognition sensors within the area based on the coordinate.

In some embodiments, when the liquid crystal display has an array of fingerprint recognition sensors, determining the number of rows and columns covered by the area and generating a rectangle recognition area with a length of the number of columns and a width of the number of rows to determining the fingerprint recognition sensors within the rectangle recognition area.

Because the shape of the area may be irregular, the electronic device may have a heavy calculation burden when determining the fingerprint recognition sensors within the area. Thus, the electronic device may determine a recognition area with a regular shape which includes the area firstly, and then acquire the coordinate, on the liquid crystal display, of each of the fingerprint recognition sensors. Then, the electronic device determines each of the fingerprint recognition sensors within the recognition area based on the coordinate.

When the liquid crystal display has an array of fingerprint recognition sensors, the recognition area may be a rectangle area. A rectangle area has a fixed length and width, so the electronic device may determine each of the fingerprint recognition sensors in the recognition area easily.

Figure 2C:
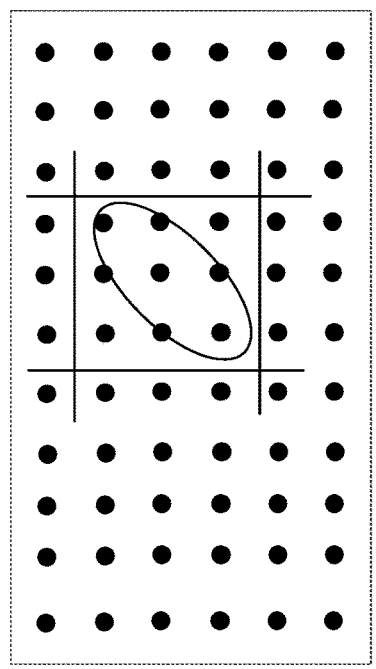
FIG. 2C is a schematic diagram illustrating a recognition area according to another exemplary embodiment.

Referring to FIG. 2C, which is a schematic diagram illustrating the recognition area, each of the dark spots distributed on the liquid crystal display represents a fingerprint recognition sensor, and the proximity area of the liquid crystal display with the finger is an elliptical area. The fingerprint recognition sensors within the area include the second one and third one in the fourth row, the second one to the fourth one in the fifth row and the third one and the fourth one in the sixth row. If the recognition area determined by the elliptical area is a rectangle area, the fingerprint recognition sensors within the rectangle area are the second to the fourth ones in the fourth to the sixth rows.

At step 205, the selected part of the fingerprint recognition sensors are controlled to perform fingerprint recognition.

Figure 2D:
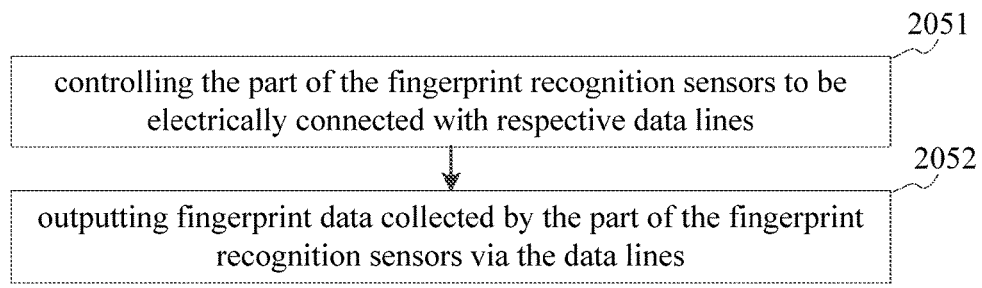
FIG. 2D is a flow diagram illustrating how to control a part of the fingerprint recognition sensors to perform fingerprint recognition according to another exemplary embodiment.

Referring to FIG. 2D, which is a flow diagram illustrating how to control the selected part of the fingerprint recognition sensors to perform fingerprint recognition, it may include the following steps.

At step 2051, the part of the fingerprint recognition sensors are controlled to electrically connect with respective data lines.

At step 2052, fingerprint data collected by the part of the fingerprint recognition sensors is output via the data lines.

After determining the fingerprint recognition sensors on the liquid crystal display, the electronic device is required to start these fingerprint recognition sensors, so as to recognize the fingerprint by these fingerprint recognition sensors. Start of the fingerprint recognition sensors may include: initializing the fingerprint recognition sensors and controlling, by an enable end, the fingerprint recognition sensors to be electrically connected with respective data lines.

When implemented, controlling the part of the fingerprint recognition sensors to be electrically connected with the respective data lines include: initializing all the fingerprint recognition sensors; and controlling the part of the fingerprint recognition sensors to be electrically connected with the data lines via enable lines, wherein each of the fingerprint recognition sensors is electrically connected with a corresponding enable line.

All the fingerprint recognition sensors are initialized (i.e., the fingerprint recognition service is started), all of them are controlled to be in an idle state and waiting for a scanning instruction. The enable end of each of the fingerprint recognition sensors is electrically connected with a corresponding data line, and the data line is used for transmitting the collected fingerprint data.

Figure 2E:
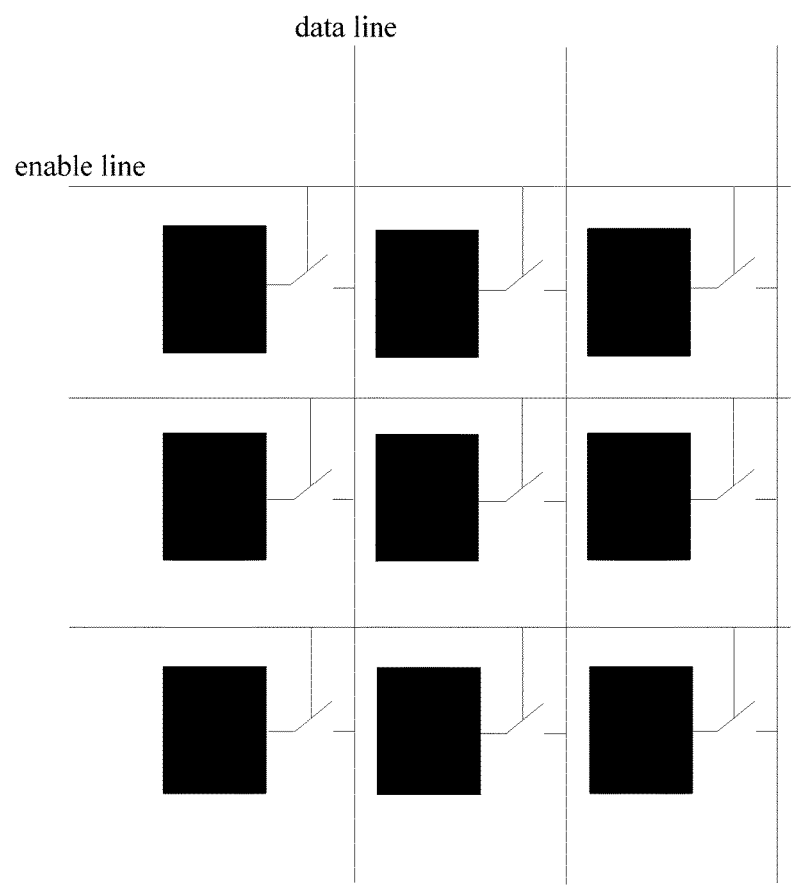
FIG. 2E is a first schematic diagram illustrating the fingerprint recognition sensors according to another exemplary embodiment.

Referring to FIG. 2E, which is a first schematic diagram illustrating the fingerprint recognition sensors, each dark rectangle represents a fingerprint recognition sensor, the horizontal line is the enable line, and the vertical line is the data line. Each fingerprint recognition sensor is connected with the corresponding enable line via a switch but not connected with the data line.

Figure 2F:
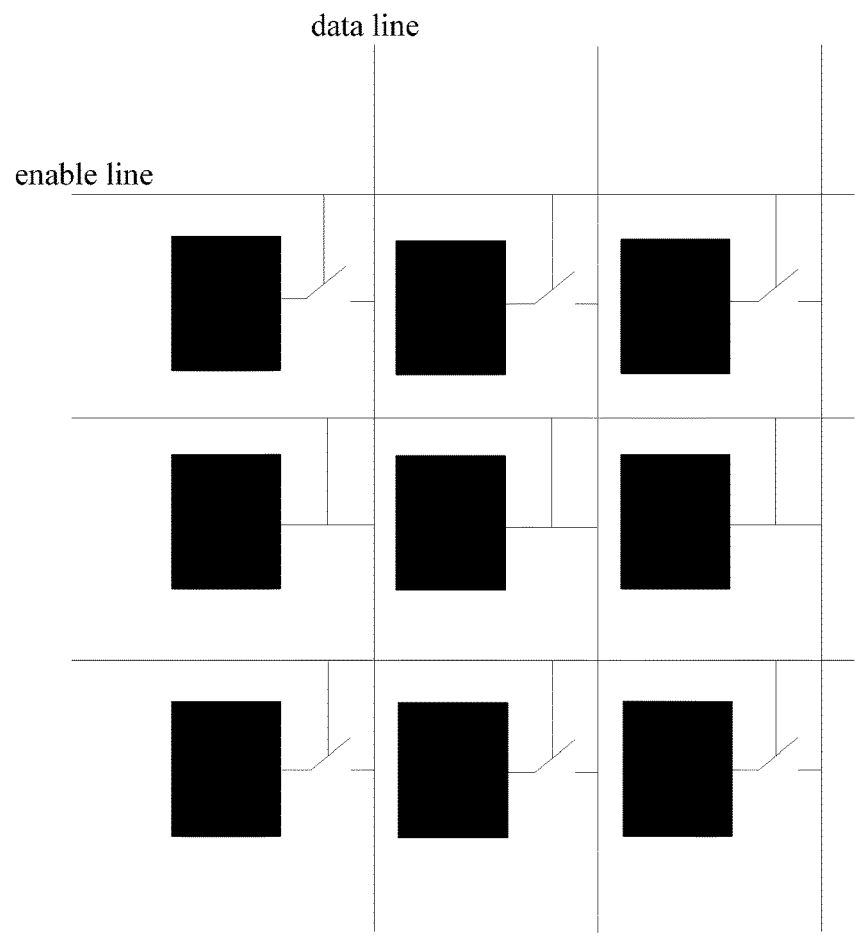
FIG. 2F is a second schematic diagram illustrating the fingerprint recognition sensors according to another exemplary embodiment.

Referring to FIG. 2F, which is a second schematic diagram illustrating the fingerprint recognition sensors, if it's assumed that the electronic device need to control the fingerprint recognition sensors in the second row to perform fingerprint recognition, an optical signal may be transmitted via the enable line to control each of the fingerprint recognition sensors in the second row to be electrically connected with the data line.

After the fingerprint recognition sensors being electrically connected with the data lines, upon a scan instruction the electronic device may control these fingerprint recognition sensors for scan to acquire the fingerprint data, and transmit these fingerprint data via the data lines to perform fingerprint recognition. When the fingerprint recognition sensor is a capacitive fingerprint recognition sensor, the fingerprint data refer to capacitance values.

It should be noted that the step for initializing the fingerprint recognition sensors may be performed as early as after step 201, such that the electronic device may perform the fingerprint recognition directly using the fingerprint recognition devices in an idle state after determining the fingerprint recognition sensors within the area, so as to improve the efficiency of fingerprint recognition. Alternatively, the initialization step may be performed after determination of the fingerprint recognition sensors required for fingerprint recognition by the electronic device at the latest, so as to avoid the resources wasting caused by premature start of the fingerprint recognition service.

In conclusion, the method for fingerprint recognition provided by the present disclosure may control a part of the fingerprint recognition sensors to perform fingerprint recognition by: acquiring a fingerprint recognition instruction; determining an area made up of a part of the optical proximity sensors after acquisition of the fingerprint recognition instruction, the distance between each of the part of the optical proximity sensors and a touch operation being less than a predetermined distance threshold; selecting a part of the fingerprint recognition sensors according to the area; and controlling the selected part of the fingerprint recognition sensors to perform fingerprint recognition. Thus, resource wasting caused by the usage of all the fingerprint recognition sensors on the liquid crystal display for fingerprint recognition may be avoided, and resources are saved.

In addition, whether the touch operation is caused by a finger is detected according to the area, and the distance between each of the part of the optical proximity sensors and the touch operation is less than the predetermined distance threshold. When it's detected that the touch operation is caused by the finger, a part of the fingerprint recognition sensors is selected according to the area after determining, by the optical proximity sensors, that it is a finger which contacts with the liquid crystal display. Thus, resource wasting caused by premature start of the fingerprint recognition service for fingerprint recognition may be avoided, so as to achieve the effect of saving resources.

Figure 3:
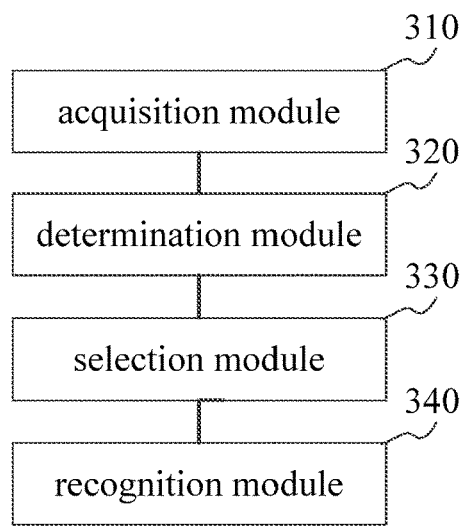
FIG. 3 is a block diagram illustrating a device for fingerprint recognition according to an exemplary embodiment.

FIG. 3 is a block diagram illustrating a device for fingerprint recognition according to an exemplary embodiment. The device for fingerprint recognition may be applied to an electronic device including a liquid crystal display, and the liquid crystal display has fingerprint recognition sensors and optical proximity sensors. As shown in FIG. 3, the finger print recognition device may include an acquisition module 310, a determination module 320, a selection module 330 and a recognition module 340.

The acquisition module 310 is configured to acquire a fingerprint recognition instruction.

The determination module 320 is configured to determine an area made up of a part of the optical proximity sensors after acquisition of the fingerprint recognition instruction acquired by the acquisition module 310, and the distance between each of the part of the optical proximity sensors and a touch operation is less than a predetermined distance threshold.

The selection module 330 is configured to select the part of the fingerprint recognition sensors according to the area determined by the determination module 320.

The recognition module 340 is configured to control the part of the fingerprint recognition sensors selected by the selection module 330 to perform fingerprint recognition.

In conclusion, the method for fingerprint recognition provided by the present disclosure may control a part of the fingerprint recognition sensors to perform fingerprint recognition by: acquiring a fingerprint recognition instruction; determining an area made up of a part of the optical proximity sensors after acquisition of the fingerprint recognition instruction, the distance between each of the part of the optical proximity sensors and a touch operation being less than a predetermined distance threshold; selecting the part of the fingerprint recognition sensors according to the area; and controlling the selected part of the fingerprint recognition sensors to perform fingerprint recognition. Thus, resource wasting caused by the use of all the fingerprint recognition sensors on the liquid crystal display for fingerprint recognition is avoided, and resources are saved.

Figure 4:
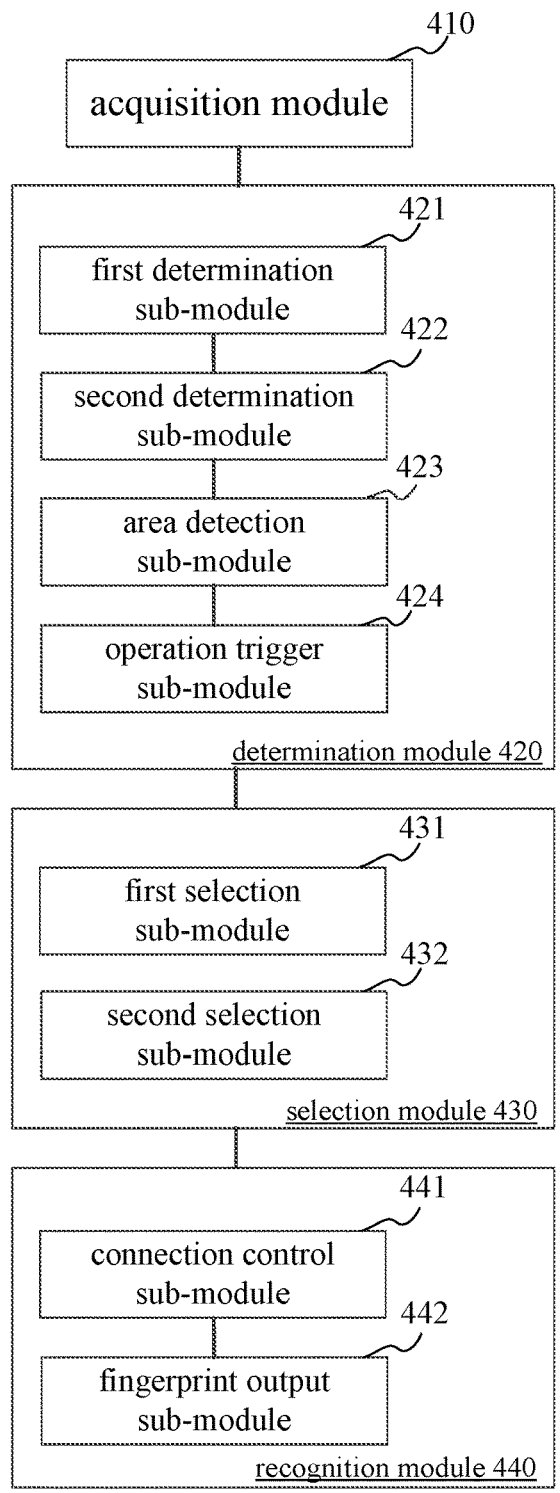
FIG. 4 is a block diagram illustrating a device for fingerprint recognition according to an exemplary embodiment.

FIG. 4 is a block diagram illustrating a device for fingerprint recognition according to an exemplary embodiment. The device for fingerprint recognition may be applied to an electronic device including a liquid crystal display, the liquid crystal display has fingerprint recognition sensors and optical proximity sensors. As shown in FIG. 4, the finger print recognition device may include an acquisition module 410, a determination module 420, a selection module 430 and a recognition module 440.

The acquisition module 410 is configured to acquire a fingerprint recognition instruction.

The determination module 420 is configured to determine an area made up of a part of the optical proximity sensors after acquisition of the fingerprint recognition instruction acquired by the acquisition module 410, and the distance between each of the part of the optical proximity sensor and a touch operation is less than a predetermined distance threshold.

The selection module 430 is configured to select the part of the fingerprint recognition sensors according to the area determined by the determination module 420.

The recognition module 440 is configured to control the part of the fingerprint recognition sensors selected by the selection module 430 to perform fingerprint recognition.

Alternatively, the determination module 420 may include a first determination sub-module 421 and a second determination sub-module 422.

The first determination sub-module 421 is configured to determine, after acquisition of the fingerprint recognition instruction, the optical proximity sensors, each of which has a receiving end having received a reflected signal, wherein the reflected signal is an optical signal emitted by a transmission end of the optical proximity sensor and reflected by the touch operation.

The second determination sub-module 422 is configured to determine a region occupied by positions of the optical proximity sensors determined by the first determination sub-module 421 as the area.

Alternatively, the determination module 420 may further include an area detection sub-module 423 and an operation trigger sub-module 424.

The area detection module 423 is configured to detect, according to the area determined by the second determination sub-module 422, whether the touch operation is triggered by a finger and the distance between each of the part of the optical proximity sensors and the touch operation is less than the predetermined distance threshold.

The operation trigger module 424 is configured to trigger the selection module 430 to perform a corresponding operation when the area detection sub-module detected that the touch operation is caused by a finger.

Alternatively, the selection module 430 may include a first selection sub-module 431 and a second selection sub-module 432.

The first selection sub-module 431 is configured to determine the fingerprint recognition sensors within the area.

The second selection sub-module 432 is configured to determine, when the liquid crystal display has an array of fingerprint recognition sensors, the number of rows and columns covered by the area and generate a rectangle recognition area with a length of the number of columns and a width of the number of rows to determine the fingerprint recognition sensors within the rectangle recognition area.

Alternatively, the recognition module 440 may include a connection control sub-module 441 and a fingerprint output sub-module 442.

The connection control sub-module 441 is configured to control the part of the fingerprint recognition sensors to be electrically connected with respective data lines.

The fingerprint output sub-module 442 is configured to output fingerprint data collected by the part of the fingerprint recognition sensors via the data lines.

Alternatively, the connection control sub-module 441 is further configured to initialize all the fingerprint recognition sensors, and control the part of the fingerprint recognition sensors to electrically connect with the corresponding data lines via enable lines, wherein each of the fingerprint recognition sensors is electrically connected with a corresponding enable line.

In conclusion, the method for fingerprint recognition provided by the present disclosure may control a part of the fingerprint recognition sensors to perform fingerprint recognition by: acquiring a fingerprint recognition instruction; determining an area made up of a part of the optical proximity sensors after acquisition of the fingerprint recognition instruction, the distance between each of the part of the optical proximity sensors and a touch operation being less than a predetermined distance threshold; selecting a part of the fingerprint recognition sensors according to the area; and controlling the selected part of the fingerprint recognition sensors to perform fingerprint recognition. Thus, resource wasting caused by the usage of all the fingerprint recognition sensors on the liquid crystal display for fingerprint recognition is voided, and resources are saved.

In addition, whether the touch operation is caused by a finger is detected according to the area; when it's detected that the touch operation is caused by the finger, a part of the fingerprint recognition sensors is selected according to the area. Thus resource wasting caused by premature start of the fingerprint recognition service for fingerprint recognition may be avoided, and resources are saved.

The present disclosure provides a device for fingerprint recognition according to an exemplary embodiment. The device for fingerprint recognition may be applied to an electronic device. The device may a liquid crystal display having fingerprint recognition sensors and optical proximity sensors; a processor; a memory for storing instructions executable by the processor; wherein the processor is configured to: acquire a fingerprint recognition instruction; determine an area made up of a part of the optical proximity sensors after acquisition of the fingerprint recognition instruction, the distance between each of the part of the optical proximity sensors and a touch operation being less than a predetermined distance threshold; select the part of the fingerprint recognition sensors according to the area; and control the selected part of the fingerprint recognition sensors to perform fingerprint recognition.

Figure 5:
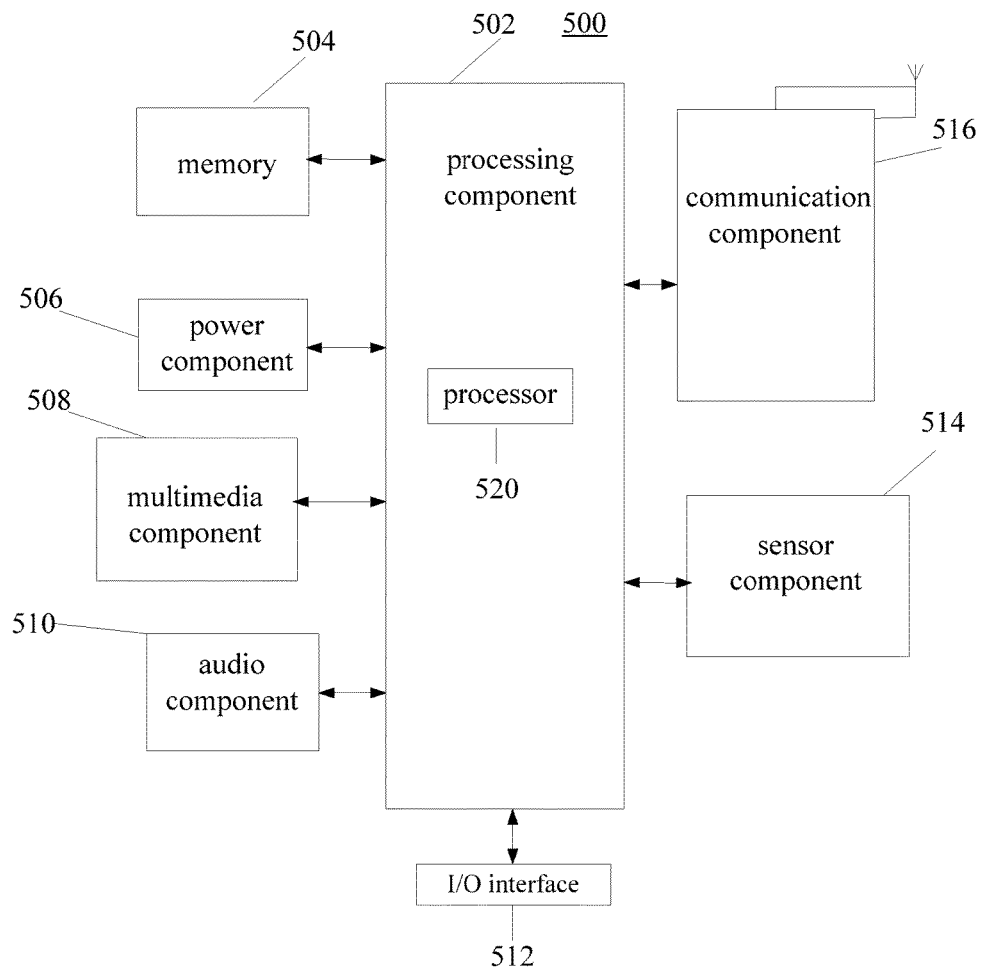
FIG. 5 is a block diagram illustrating a device for fingerprint recognition according to an exemplary embodiment.

FIG. 5 is a block diagram for a device 500 for fingerprint recognition according to an exemplary embodiment. For example, the device 500 may be a mobile phone, a computer, a digital broadcast terminal, a messaging device, a gaming console, a tablet, a medical device, an exercise equipment, a personal digital assistant, and the like.

Referring to FIG. 5, the device 500 may include one or more of the following components: a processing component 502, a memory 504, a power component 506, a multimedia component 508, an audio component 510, an input/output (I/O) interface 512, a sensor component 514, and a communication component 516.

The processing component 502 typically controls overall operations of the device 500, such as the operations associated with display, telephone calls, data communications, camera operations, and recording operations. The processing component 502 may include one or more processors 520 to execute instructions to perform all or part of the steps in the above described methods. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation of the device 500. Examples of such data include instructions for any applications or methods operated on the device 500, contact data, phonebook data, messages, pictures, video, etc. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the device 500. The power component 506 may include a power management system, one or more power sources, and any other components associated with the generation, management, and distribution of power for the device 500.

The multimedia component 508 includes a screen providing an output interface between the device 500 and the user. In some embodiments, the screen may include a Liquid Crystal Display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 508 includes a front camera and/or a rear camera. The front camera and the rear camera may receive an external multimedia datum while the device 500 is in an operation mode, such as a photographing mode or a video mode. Each of the front camera and the rear camera may be a fixed optical lens system or have optical focusing and zooming capability.

The audio component 510 is configured to output and/or input audio signals. For example, the audio component 510 includes a microphone (MIC) configured to receive an external audio signal when the device 500 is in an operation mode, such as a call mode, a recording mode, and a voice recognition mode. The received audio signal may be further stored in the memory 504 or transmitted via the communication component 516. In some embodiments, the audio component 510 further includes a speaker to output audio signals.

The I/O interface 512 provides an interface between the processing component 502 and peripheral interface modules, the peripheral interface modules being, for example, a keyboard, a click wheel, buttons, and the like. The buttons may include, but are not limited to, a home button, a volume button, a starting button, and a locking button.

The sensor component 514 includes one or more sensors to provide status assessments of various aspects of the device 500. For instance, the sensor component 514 may detect an open/closed status of the device 500, relative positioning of components (e.g., the display and the keypad, of the device 500), a change in position of the device 500 or a component of the device 500, a presence or absence of user contact with the device 500, an orientation or an acceleration/deceleration of the device 500, and a change in temperature of the device 500. The sensor component 514 may include a proximity sensor configured to detect the presence of a nearby object without any physical contact. The sensor component 514 may also include a light sensor, such as a CMOS or CCD image sensor, for use in imaging applications. In some embodiments, the sensor component 514 may also include an accelerometer sensor, a gyroscope sensor, a magnetic sensor, a pressure sensor, or a temperature sensor.

The communication component 516 is configured to facilitate communication, wired or wirelessly, between the device 500 and other devices. The device 500 can access a wireless network based on a communication standard, such as WiFi, 2G, or 3G, or a combination thereof. In an exemplary embodiment, the communication component 516 receives a broadcast signal or broadcast associated information from an external broadcast management system via a broadcast channel. In an exemplary embodiment, the communication component 516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 504, executable by the processor 520 in the device 500, for performing the above-described methods. For example, the non-transitory computer-readable storage medium may be a ROM, a RAM, a CD-ROM, a magnetic tape, a floppy disc, an optical data storage device, and the like.

Other embodiments of the invention will be apparent to those skilled in the art from consideration of the specification and practice of the disclosures herein. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the invention being indicated by the following claims.

It will be appreciated that the disclosure is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for fingerprint recognition applied in an electronic device comprising a liquid crystal display, the liquid crystal display having fingerprint recognition sensors and optical proximity sensors, the method comprising:
   acquiring a fingerprint recognition instruction;
   determining an area made up of a part of the optical proximity sensors after acquisition of the fingerprint recognition instruction, the distance between each of the part of the optical proximity sensor and a touch operation being less than a predetermined distance threshold;
   selecting a part of the fingerprint recognition sensors according to the area; and
   controlling the selected part of the fingerprint recognition sensors to perform fingerprint recognition.

2. The method of claim 1, wherein determining the area made up of a part of the optical proximity sensors after acquisition of the fingerprint recognition instruction comprises:
   determining, after acquisition of the fingerprint recognition instruction, the part of the optical proximity sensors having receiving ends that receive reflected signals, wherein the reflected signals are signals obtained by reflection of optical signals emitted from transmission ends of the part of the optical proximity sensors by the touch operation; and
   determining a region occupied by positions of the part of the optical proximity sensors as the area.

3. The method of claim 2, wherein determining the area made up of a part of the optical proximity sensors after acquisition of the fingerprint recognition instruction comprises:
   detecting, according to the area, whether the touch operation is caused by a finger, the distance between each of the part of the optical proximity sensors and the touch operation being less than the predetermined distance threshold; and
   selecting the part of the fingerprint recognition sensors according to the area when it is detected that the touch operation is caused by the finger.

4. The method of claim 3, wherein controlling the selected part of the fingerprint recognition sensors to perform fingerprint recognition comprises:
   controlling the part of the fingerprint recognition sensors to be electrically connected with respective data lines; and
   outputting fingerprint data collected by the part of the fingerprint recognition sensors via the data lines.

5. The method of claim 2, wherein controlling the selected part of the fingerprint recognition sensors to perform fingerprint recognition comprises:
   controlling the part of the fingerprint recognition sensors to be electrically connected with respective data lines; and
   outputting fingerprint data collected by the part of the fingerprint recognition sensors via the data lines.

6. The method of claim 1, wherein selecting the part of the fingerprint recognition sensors according to the area comprises:
   determining the fingerprint recognition sensors within the area.

7. The method of claim 1, wherein selecting the part of the fingerprint recognition sensors according to the area comprises:
   determining, when the liquid crystal display has an array of fingerprint recognition sensors, the number of rows and columns covered by the area, and generating a rectangle recognition area with a length of the number of columns and a width of the number of rows to determine the fingerprint recognition sensors within the rectangle recognition area.

8. The method of claim 1, wherein controlling the selected part of the fingerprint recognition sensors to perform fingerprint recognition comprises:
   controlling the part of the fingerprint recognition sensors to be electrically connected with respective data lines; and
   outputting fingerprint data collected by the part of the fingerprint recognition sensors via the data lines.

9. The method of claim 8, wherein controlling the part of the fingerprint recognition sensors to be electrically connected with the corresponding data lines comprises:
   initializing all the fingerprint recognition sensors; and
   controlling the part of the fingerprint recognition sensors to be electrically connected with the data lines via enable lines, wherein each of the fingerprint recognition sensors is electrically connected with a corresponding enable line.

10. A device for fingerprint recognition, comprising:
a liquid crystal display having fingerprint recognition sensors and optical proximity sensors;
a processor; and
a memory for storing instructions executable by the processor;
wherein the processor is configured to:
acquire a fingerprint recognition instruction;
determining an area made up of a part of the optical proximity sensors after acquisition of the fingerprint recognition instruction, the distance between each of the part of the optical proximity sensor and a touch operation being less than a predetermined distance threshold;
select a part of the fingerprint recognition sensors according to the area; and
control the part of the fingerprint recognition sensors to perform fingerprint recognition.

11. The device of claim 10, wherein the processor is further configured to:
determine, after acquisition of the fingerprint recognition instruction, the part of the optical proximity sensors having receiving ends that receive reflected signals, wherein the reflected signals are signals obtained by reflection of optical signals emitted from transmission ends of the part of the optical proximity sensors by the touch operation; and
determine a region occupied by positions of the optical proximity sensors as the area.

12. The device of claim 11, wherein the processor is further configured to:
detect, according to the area, whether the touch operation is caused by a finger, the distance between each of the part of the optical proximity sensor and the touch operation being less than a predetermined distance threshold; and
select the part of the fingerprint recognition sensors according to the area when it is detected that the touch operation is caused by the finger.

13. The device of claim 12, wherein the processor is further configured to:
control the part of the fingerprint recognition sensors to be electrically connected with respective data lines; and
output fingerprint data collected by the part of the fingerprint recognition sensors via the data lines.

14. The device of claim 11, wherein the processor is further configured to:
control the part of the fingerprint recognition sensors to be electrically connected with respective data lines; and
output fingerprint data collected by the part of the fingerprint recognition sensors via the data lines.

15. The device of claim 10, wherein the processor is further configured to:
determine the fingerprint recognition sensors within the area.

16. The device of claim 15, wherein the processor is further configured to:
control the part of the fingerprint recognition sensors to be electrically connected with respective data lines; and
output fingerprint data collected by the part of the fingerprint recognition sensors via the data lines.

17. The device of claim 10, wherein the processor is further configured to:
determine, when the liquid crystal display has an array of fingerprint recognition sensors, the number of rows and columns covered by the area, and generate a rectangle recognition area with a length of the number of columns and a width of the number of rows to determine the fingerprint recognition sensors within the rectangle recognition area.

18. The device of claim 10, wherein the processor is further configured to:
control the part of the fingerprint recognition sensors to be electrically connected with respective data lines; and
output fingerprint data collected by the part of the fingerprint recognition sensors via the data lines.

19. The device of claim 18, wherein the processor is further configured to:
initialize all the fingerprint recognition sensors, and control the part of the fingerprint recognition sensors to be electrically connected with the data lines via enable lines, wherein each of the fingerprint recognition sensors is electrically connected with a corresponding enable line.

20. A non-transitory computer-readable storage medium having stored therein instructions that, when executed by a processor of a device, causes the device to perform a method for fingerprint recognition, the method comprising:
acquiring a fingerprint recognition instruction;
determining an area made up of a part of the optical proximity sensors after acquisition of the fingerprint recognition instruction, the distance between each of the part of the optical proximity sensor and a touch operation being less than a predetermined distance threshold;
selecting a part of the fingerprint recognition sensors according to the area; and
controlling the selected part of the fingerprint recognition sensors to perform fingerprint recognition.

* * * * *